3,393,220
PROCESS FOR THE PREPARATION OF HIGH PURITY PHTHALONITRILES
Charles N. Winnick, Teaneck, N.J., and Irwin Schlossman, Whitestone, N.Y., assignors to Halcon International, Inc., a corporation of Delaware
No Drawing. Filed Nov. 18, 1964, Ser. No. 412,227
6 Claims. (Cl. 260—465)

ABSTRACT OF THE DISCLOSURE

A high purity phthalonitrile is prepared by distilling a crude phthalonitrile in a distillation system having at least three trays, the overall ratio of reflux to feed being from 0.05 to 20, the temperatures at the top of the distillation column being from 235° C. to 320° C.

---

This invention relates to a new and improved process for the preparation of polyester precursors. More specifically, this invention relates to the preparation of a high-purity phthalonitrile and the conversion thereof to polyesters.

Aromatic di-acids such as terephthalic acid and isophthalic acid are important chemicals for the preparation of linear polyesters. When used in this application it is essential that substantially all impurities be removed.

Purification of these materials is particularly difficult because of their very high melting point and lack of solubility. As a result, processes in the past have been concerned with converting the acids into esters or other salts which may be more readily purified.

Conventionally, terephthalic acid is produced by the liquid phase oxidation of alkyl aromatics such as para-xylene or para-cymene. The oxidation is generally performed with air or nitric acid in one or two steps. Though these processes serve to convert the alkyl aromatics directly to the terephthalic acid, they have not been entirely satisfactory, since, as stated above, purification was difficult.

More recently, another route to terephthalic acid was developed, which, though involving a greater number of chemical reactions, is attractive because of high yields and selectivities. This approach calls for the vapor phase oxidation of the alkyl aromatic in the presence of ammonia (ammoxidation) to the dinitrile and the subsequent saponification or esterification and hydrolysis to the desired acid. In the case of the preparation of terephthalic acid, paraxylene is ammoxidized to terephthalonitrile, which, in one embodiment, is converted to the acid, usually by treating with an acid or base.

Unfortunately, the terephthalic acid produced by this route also contains color bodies and impurities which are detrimental to the use of the material, particularly for the production of synthetic fibers. Attempts have been made to purify the terephthalic acid by crystallization from costly solvents, such as dimethyl formamide; conversion to a water soluble salt; and treatment with an oxidant and/or activated carbon. In addition to being cumbersome, these procedures have not met with complete success.

In accordance with the invention, it has now been found that unexpectedly high quality phthalic acids may be produced from phthalonitriles by subjecting the phthalonitriles from the vapor phase ammoxidation of xylene to distillation step, wherein careful control is exercised on the quality of phthalonitrile obtained therefrom. This procedure is particularly surprising, since it was generally accepted that the impurities were formed in conjunction with the phthalic acid step, and therefore that treatment of the phthalonitrile would be premature and ineffective. It has been reported in the art that conventional purification of the nitrile does not lead to suitably pure phthalic. Additionally, since the formation of impurities and color bodies is generally aggravated by very high temperatures, a distillation step effected with these high boiling materials would normally be considered highly detrimental to an end product where trace contaminants (p.p.m.) affect fiber properties. Furthermore, the instant invention is particularly important because other methods of purifying phthalonitriles, such as washing and recrystallization from various solvents, are not feasible. Though the instant application is generally applicable to the formation of pure phthalic acids from phthalonitriles, its application is particularly outstanding where the phthalonitrile is formed by the ammoxidation of xylene. Most important is the preparation of isophthalic acids from meta- and para-xylenes.

The distillation must be performed in a distillation system capable of yielding a product having a TEG color as defined of less than 250. Additionally, the system must be capable of separating 85% of the phthalonitrile present in the feed as high purity products. Such distillation systems have a minimum of three or four plates and an overall reflux to feed ratio of at least 0.5, preferably 0.1. Of course, a large number of plates, say as many as 200, can be used as well as reflux ratios up to 20:1. Generally, however, there is no great advantage in using more than 50 plates and reflux in excess of 5:1. Depending on the pressure employed, the temperature at the top of the distillation tower should be between 235 to 320° C. Higher temperatures have an adverse effect on the phthalonitrile because of the formation of resinous materials. Distillation pressures of from 200 mm. Hg to 1500 mm. Hg are useful; however, atmospheric pressure is most conveniently employed. Of course, the distillation system may contain one or more columns.

The nitriles subject to the distillation are obtained by the ammoxidation of xylene in the vapor phase. This reaction may be carried out over a moderately wide temperature range of 300 to 500° C., preferably at about atmospheric pressure, although superatmospheric pressure, e.g., up to 500 p.s.i.g., may be employed.

The concentration of oxygen in the reaction mixture may vary within wide limits. Generally, it is preferred to feed to the reactor a gas mixture containing at least 4% of oxygen, and at least 3 moles of oxygen per mole of hydrocarbon. Such a mixture may be, for instance, air or mixture of air with oxygen. The ratio of ammonia to the xylene in the reaction mixture may vary within wide limits. It is, however, preferred to use at least twice the theoretical amount of ammonia to the stoichiometric reaction, i.e., at least 4 moles of ammonia per mole of hydrocarbon. In a particularly preferred embodiment, where the starting material is p-xylene, it is desirable to use a ratio of about 6 moles of ammonia per mole of xylene.

The concentration of xylene is preferably kept low and it is desirable to use concentrations not higher than about 2% by volume of the total gaseous reaction mixture; 1½% by volume in particularly preferred. If higher concentrations than this are used, explosive mixtures of hydrocarbon and oxygen may build up. The aromatic nitriles produced in the process may be recovered by conventional means, for instance, by cooling the hot gases to temperatures at which the nitriles will be condensed as liquid or solid.

Catalysts employed for the ammoxidation reaction contain a compound of vanadium, preferably in combination with a compound of another metal such as tin, antimony, chromium, bismuth, platinum and molybdenum.

While the invention is primarily directed towards the purification of terephthalonitrile, in its most preferred embodiment it contemplates the ultimate conversion of these materials to the polyester. Many processes have been developed for these conversions, and these will be described in terms of the major intermediate formed in the path to polyester production. (Of course, these intermediates may be employed for other purposes.) For simplicity, the following discussion shall consider terephthalonitrile reactions, but it should be understood that similar sequences may be used with isophthalonitrile.

A most important route to the polyester is through the production of terephthalic acid. This acid intermediate may be produced by three basic routes from the dinitrile:

(1) Reaction with molar quantities of sodium hydroxide in the presence of water at a temperature of about 75–200° C. to produce a disodium salt of the aromatic acid and evolve ammonia. The sodium salt is neutralized with acid to precipitate terephthalic acid in the second step of this route.

(2) Hydrolysis in an aqueous medium with a basic catalyst at a temperature of about 200 to 300° C.; the terephthalonitrile may be readily converted to primarily the ammonium salt. An analogous procedure is showing in U.S. Patent 2,979,526. By either neutralization or steam stripping, terephthalic acid may be formed. See, for example, U.S. Patent 3,031,500.

(3) Aqueous sulphuric acid may be used to convert the terephthalonitrile directly to terephthalic acid and ammonium in a one step process.

The terephthalic acid, once produced, may then be polymerized with ethylene glycol to form the polyethylene terephthalate. This procedure is illustrated in U.S. Patents 3,047,621 and 3,050,548.

Still another intermediate is bis-beta hydroxyethyl terephthalate. A variety of processing steps, similar to those discussed above, may be used to form this intermediate, namely, a base catalyzed one-step reaction with an excess of ethylene glycol (see U.S. Patent 2,921,088); and two-step reactions, wherein the first step is base catalyzed or acid catalyzed to form ammonium salts or amide sulfate, respectively. In both cases the second step calls for reaction with ethylene glycol to form the bis-beta hydroxyethyl terephthalate.

The preparation of the polyester from the bis-beta hydroxyethyl terephthalate is described in U.S. Patent 3,101,366.

The final mode of preparing the polyester from the dinitrile is a direct conversion. Preferably the terephthalonitrile and the ethylene glycol are reacted in an aqueous, base catalyzed system and excess glycol removed by distillation. The reaction is performed at 150–300°.

The many reactions stated above can be simplified, since in each case, with the exception of the one-step reactions, the terephthalonitrile is initially hydrolyzed. These hydrolysis steps are either acidic, basic or base catalyzed. An inert gas, i.e., nitrogen or air, may be bubbled through the solution to facilitate ammonia removal. This ammonia may be recycled to the ammoxidation step.

The following table shows the preferred conditions for these reactions:

TABLE 1

| Type of Hydrolysis | Temperature, °C. | Concentrations | |
|---|---|---|---|
| | | Water, Moles per Mole of Nitrile | Acid or Base Equivalents per Mole of Nitrile |
| Basic: | | | |
| Broadly | 50–225 | 25–250 | 1.9–4.0 |
| Preferably | 90–150 | 75–150 | 2.0–2.2 |
| Acidic: | | | |
| Broadly | 100–250 | 4–50 | 1.5–10 |
| Preferably | 150–200 | 6–10 | 2.0–4 |
| Base Catalyzed: | | | |
| Broadly | 150–300 | 15–250 | .001–.10 |
| Preferably | 225–275 | 35–100 | .007–.02 |

Where the basic hydrolysis is used, an alkali or alkaline earth metal base such as an oxide, hydroxide or carbonate is used. Most preferred is sodium and potassium hydroxide. In the case of the acidic hydrolysis a strong mineral acid is employed, such as sulphuric acid.

In the one-step reactions to bis beta-hydroxyethyl terephthalate and the polyester, ethylene glycol is added to the terephthalonitrile along with other reactants. In the case of the bis beta-hydroxyethyl, a molar excess is added, preferably at least 4 moles of ethylene glycol per mole of terephthalonitrile. A lower glycol level, preferably about one mole per mole of terephthalonitrile, is added in the formation of the polyester.

In the preparation of terephthalic acid, by basic hydrolysis of the nitrile, the material must be neutralized or at least brought to a condition where the pH is below 8. This is accomplished generally by the use of organic or inorganic acids. The strong mineral acids, namely, sulfuric acid, phosphoric acid, hydrochloric acid, and nitric acid, are preferably employed. However, the lower carboxylic acid, such as acetic or propionic acid, may also be employed. The temperature of the neutralization is broadly from 0 to 150° C. and the pressures from 0 to 100 p.s.i.g.

During the neutralization step the insoluble acid is precipitated from the solution. It may be separated by any procedure as, for example, filtration, washing with water, or other means which are advantageous to obtain high purity.

The color forming properties of phthalonitriles are determined by conversion to the corresponding acids and treatment of the acid with triethylene glycol.

One tenth of a mole (12.8 g.) of the dinitrile is refluxed with a solution of 0.22 mole (8.8 g.) of NaOH in 200 ml. of water at atmospheric pressure, while a slow stream of nitrogen is passed through the solution for 16 hours. The solution is then cooled and added slowly to a well agitated solution of 0.11 mole (10.8 g.) of $H_2SO_4$ in 50 ml. of water maintained at about 25° C. The resultant precipitate is washed with boiling water and dried at 100° C. in vacuo.

Four grams of terephthalic acid and about 28 milliliters of triethylene glycol are combined in a glass tube. The solution is heated in aluminum block at 500° F. with nitrogen purge for about 1 hour. The tube is removed and cooled to room temperature in about 30 minutes. The solution is diluted with isopropyl alcohol 1:1, and the color of the resulting diluted solution is compared to standard APHA colors (platinic cobalt chloride solutions) by measuring absorbance with a Fisher electrophotometer using a 650 red filter and a 425 blue filter. This evaluation of the aromatic polycarboxylic acid color is reported herein as "TEG color."

To be sufficiently pure for direct conversion to an ester of high purity, terephthalic acid should have a TEG color of less than 250. For direct conversion to bis-glycol terephthalate, or a polyester thereof such as polyethylene terephthalate, terephthalic acid should have a TEG color of less than 150, preferably a TEG color of 100 or less. Since the ammoxidation product generally has a TEG color over 500, subsequent purification is mandatory.

To more fully describe the instant invention, attention is directed to the following examples:

EXAMPLE 1

Air, para-xylene, ammonia and steam (82.5/1.5/6.0/10 by volume) at 40 p.s.i.a. and 235° F. are preheated to 485° F. and fed to a tubular catalytic reactor with molten salt at 750–760° F. on the shell side. The catalyst is comprised of 1.3% $V_2O_5$ and 8.1% $Sb_2O_3$ on alumina. Para-xylene conversion is close to 100%, the selectivity to terephthalonitrile being near 80% and that to $CO_2$ being 8–12%. The reactor effluent is initially cooled to 475° F. and then passed to an oil cooled switch condenser where the gases are cooled to 150° F. to condense out essentially all the product as solid terephthalonitrile of approximately 90% purity and having a TEG color in excess of 500.

The crude terephthalonitrile is distilled at atmospheric pressure in a batch still using a one-inch 20 plate Oldershaw column. The terephthalonitrile is taken overhead at 285° C. at a 10:2 reflux ratio.

One mole (128 g.) of distilled terephthalonitrile is refluxed with an aqueous solution of 2.2 moles of sodium hydroxide in 2 liters of $H_2O$ at atmospheric pressure for 9 hours. A slow stream of steam of nitrogen is bubbled through the solution to aid ammonia removal and the exit gas is bubbled through a water scrubber. 95% of the theoretical amount of ammonia is recovered. The aqueous solution of di-sodium terephthalate is added slowly to a solution of 1.1 moles of sulfuric acid in 440 ml. water at 25° C. with good agitation. The resulting solid is recovered by filtration and washed with boiling water. The nitrogen content of the terephthalic acid is 6 p.p.m. and the TEG color is 85–125 and clear.

EXAMPLE 2

Preparation of bis beta-hydroxyethyl terephthalate.— A reaction mixture consisting of 46.2 g. of distilled terephthalonitrile, 640 g. of water and 0.4 g. of potassium hydroxide is heated to 250° C. for a period of 5 hours in a one liter autoclave. After the reaction is completed the autoclave is drained and the contents filtered. The reactor effluent is filtered and evaporated to dryness under vacuum in a Labline evaporation unit.

Twenty grams of the above solids, 97.7 g. of ethylene glycol, 6 g. of water and 0.2 g. of NaOH are heated to 195–200° C. in a stirred flask. Wet nitrogen is introduced into the flask to aid $NH_3$ removal. The reaction is essentially completed in about 6 hours. Bis beta-hydroxyethyl terephthalate precipitates from the glycol solution on cooling in a 75% yield. After recrystallization from water it contains 7 p.p.m. of nitrogen and the TEG color measured as described above with substitution of an equivalent amount of bis beta-hydroxyethyl terephthlate for terephthalic acid is 70–115 and clear.

EXAMPLE 3

Twenty grams of distilled terephthalonitrile, 5.7 g. of water, 97.7 g. of ethylene glycol and 0.2 g. of NaOH are refluxed at 195–200° for a period of 6 hours. Wet nitrogen is introduced into the flask to facilitate $NH_3$ removal. After 4 hours approximately 40% of the theoretical $NH_3$ is collected. Twenty hours is required for almost theoretical removal of $NH_3$. When the reaction mass was cooled, bis beta-hydroxyethyl terephthalate in 88% yield is obtained. After recrystallization from water, nitrogen is 8 p.p.m. and TEG color 80–120 and clear.

EXAMPLE 4

A mixture of 2 g. of distilled terephthalonitrile, 100 g. of water and 3.2 g. of $H_2SO_4$ is heated to 200° C. for a period of 3 hours in a glass lined vessel. The effluent is cooled, filtered and the resulting solids washed with boiling water. An essentially quantitative yield of terephthalic acid containing 25 p.p.m. of nitrogen was obtained. The TEG color was 120–180.

EXAMPLE 5

Example 3 is repeated except that after twenty hours of heating with a wet nitrogen sparge; the sparge is discontinued and glycol distilled from the pot at reduced pressure gradually increasing pot temperature to 220° C. Final pressure is 1 mm. Hg. On cooling, a colorless polymer with good fiber forming properties is obtained.

EXAMPLE 6

Example 1 is repeated using meta-xylene in place of para-xylene. A crude isophthalonitrile product having a TEG color in excess of 500 is obtained. After distillation, the color of the product is about 100 and clear.

EXAMPLE 7

Example 1 is repeated except that the terephthalonitrile is purified by water washing and recrystallization from methanol. The TEG color of the resultant terephthalic acid is 400–500. This is clearly unsatisfactory for polyester production.

We claim:
1. A process for the preparation of high purity phthalonitriles which comprises distilling a crude phthalonitrile produced by the vapor phase ammoxidation of a xylene as overhead in a distillation system having at least three trays and an overall reflux to feed ratio of from 0.05 to 20, the temperature at the top of the distillation column being from 235° C. to 320° C., thereby producing a high purity phthalonitrile distillate of such quality that the acid obtained by hydrolysis thereof shows a TEG color of less than 250.

2. The process of claim 1 wherein at least 85% of the phthalonitrile in the crude phthalonitrile is recovered as said distillate.

3. The process of claim 1 wherein said phthalonitrile is terephthalonitrile or isophthalonitrile.

4. A process for producing high purity phthalonitrile which comprises: contacting para-xylene with oxygen and and ammonia in the presence of an ammoxidation catalyst at a temperature from 300 to 500° C. in the vapor phase; withdrawing a reactor effluent; condensing said effluent, thereby obtaining a crude mixture of terephthalonitrile; distilling said crude mixture as overhead in a distillation column having at least three trays at a temperature of from 235 to 320° C., and an overall reflux to feed ratio of from 0.05 to 20, thereby producing a high pury terephthalonitrile distillate containing at least 85% of the terephthalonitrile in said crude mixture, said distillate being of such quality that the acid obtained by hydrolysis thereof shows a TEG color of less than 250.

5. The process of claim 4 wherein said catalyst contains vanadium.

6. The process of claim 4 wherein said catalyst is a combination of vanadium and antimony.

References Cited

UNITED STATES PATENTS

| | | | |
|---|---|---|---|
| 2,833,807 | 5/1958 | Farkas et al. | 260—465 |
| 2,846,462 | 8/1958 | Hadley | 260—465 |
| 2,982,780 | 5/1961 | Fierce et al. | 260—465 |

JOSEPH P. BRUST, *Primary Examiner.*